United States Patent
DeFelice

(10) Patent No.: US 10,436,337 B2
(45) Date of Patent: Oct. 8, 2019

(54) SPRING SEAT DIAPHRAGM RETENTION GROOVES

(71) Applicant: Hamilton Sundstrand Corporation, Charlotte, NC (US)

(72) Inventor: Robert DeFelice, South Windsor, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 15/383,638

(22) Filed: Dec. 19, 2016

(65) Prior Publication Data

US 2018/0172170 A1   Jun. 21, 2018

(51) Int. Cl.
F16K 17/04 (2006.01)
F16K 27/02 (2006.01)

(52) U.S. Cl.
CPC .......... *F16K 17/0453* (2013.01); *F16K 17/04* (2013.01); *F16K 27/02* (2013.01)

(58) Field of Classification Search
CPC ....... F16K 17/0453; F16K 17/04; F16K 27/02
USPC ......................................................... 137/536
See application file for complete search history.

(56) References Cited

U.S. PATENT DOCUMENTS

| 762,767 A | 6/1904 | Scott |
|---|---|---|
| 3,207,175 A | 9/1965 | Pauly |
| 3,397,712 A | 8/1968 | Boroson |
| 3,623,495 A | 11/1971 | Erb |
| 5,107,887 A | 4/1992 | White et al. |
| 5,836,571 A | 11/1998 | Streitman et al. |
| 6,789,569 B2 | 9/2004 | Kuhn et al. |
| 2015/0034178 A1* | 2/2015 | Vasquez .................. F16K 17/04 137/471 |
| 2016/0161012 A1* | 6/2016 | Jaeckle .............. G05D 16/0655 137/543.17 |

FOREIGN PATENT DOCUMENTS

| EP | 2182262 A1 | 5/2010 |
|---|---|---|
| EP | 2579119 A2 | 4/2013 |
| EP | 3028106 A1 | 6/2016 |
| FR | 2301046 A1 | 9/1976 |
| GB | 1189186 A | 4/1970 |

OTHER PUBLICATIONS

Extended European Search Report prepared by Examiner Bernhard Muller of the European Patent Office, dated May 15, 2018, issued in corresponding European Patent Application No. 17208499.8.

* cited by examiner

*Primary Examiner* — P. Macade Nichols
(74) *Attorney, Agent, or Firm* — Locke Lord LLP; Daniel J. Fiorello; Joshua L. Jones

(57) ABSTRACT

A pressure relief valve controller (PRVC) includes a housing having a spring, a spring seat connected to the spring, a piston, and a portion of which is disposed between the spring seat and the piston, wherein one or more grooves and/or protrusions are disposed on at least one of the spring seat or the piston. The diaphragm can conform to the one or more grooves of the spring seat thus preventing diaphragm rupture due to excess pressure without affecting calibrations of current PRVCs.

12 Claims, 3 Drawing Sheets

SPRING SEAT DIAPHRAGM RETENTION GROOVES

BACKGROUND OF THE INVENTION

1. Field of the Invention

The present disclosure generally relates to pressure relief valve controllers, and more specifically, to spring seats for use in a pressure relief valve controller (PRVC).

2. Description of Related Art

In a PRVC, the diaphragm is typically squeezed between the spring seat and a piston. As such, conventional PRVCs experience failure when the diaphragm, which separates a pressurized chamber from ambient air, bursts due to excessive air pressure. Specifically, the excess air pressure causes the diaphragm to stretch over the piston, causing the diaphragm to rupture and/or require replacement. The conventional techniques have been considered satisfactory for their intended purpose. However, there is an ever present need for improved spring seat and/or diaphragm for a pressure relief valve controller. This disclosure provides a solution for this need.

SUMMARY OF THE INVENTION

In accordance with at least one aspect of this disclosure, a pressure relief valve controller (PRVC) includes a housing having a spring, a spring seat connected to the spring, a piston, and a portion of which is disposed between the spring seat and the piston, wherein one or more grooves and/or protrusions are disposed on at least one of the spring seat or the piston. The diaphragm can conform to the one or more grooves of the spring seat thus preventing diaphragm rupture due to excess pressure without affecting calibrations of current PRVCs.

The one or more grooves can be annular and/or conical. In certain embodiments, the diaphragm can comprise a rubber material. The diaphragm can also contact the spring seat. As such, the one or more grooves in the diaphragm can include two annular grooves that are concentric. In some embodiments, the PRVC can also include a fastener disposed through each of the spring seat, the piston, and the diaphragm. A nut can be coupled to the fastener. Furthermore, in some embodiments, the PRVC can also include a lever contacting the piston, wherein the lever has a fulcrum mounted to the housing.

In certain embodiments, a spring seat arrangement for a pressure relief valve controller is disclosed that includes a spring seat having a plurality of annular grooves disposed therein. The plurality of annular grooves can have a V-shaped cross-section. The spring seat can further include a hole disposed through a center of the spring seat.

A method for assembling a PRVC includes mating a piston with a first side of the diaphragm, and mating a spring seat with a second side of the diaphragm, wherein the second side is opposite the first side, and wherein the spring seat has at least one groove disposed therein. The method also includes inserting a fastener through the piston, the diaphragm, and the spring seat, and tightening a nut to the fastener to form a pressure relief valve controller assembly. The method further includes heating the PRVC assembly via a heat source, removing the PRVC assembly from the heat source, and further tightening the nut to the fastener.

The heating can conform the diaphragm to at least one groove disposed in the spring seat. The heating of the PRVC assembly can occur for between about 30 minutes and about 120 minutes. In some embodiments, the heating of the PRVC assembly can occur at a temperature of between about 37 degrees Celsius and about 177 degrees Celsius. The further tightening can occur while the diaphragm is at a temperature above room temperature. In some embodiments, the further tightening can conform a portion of the diaphragm to the at least one groove disposed in the spring seat.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
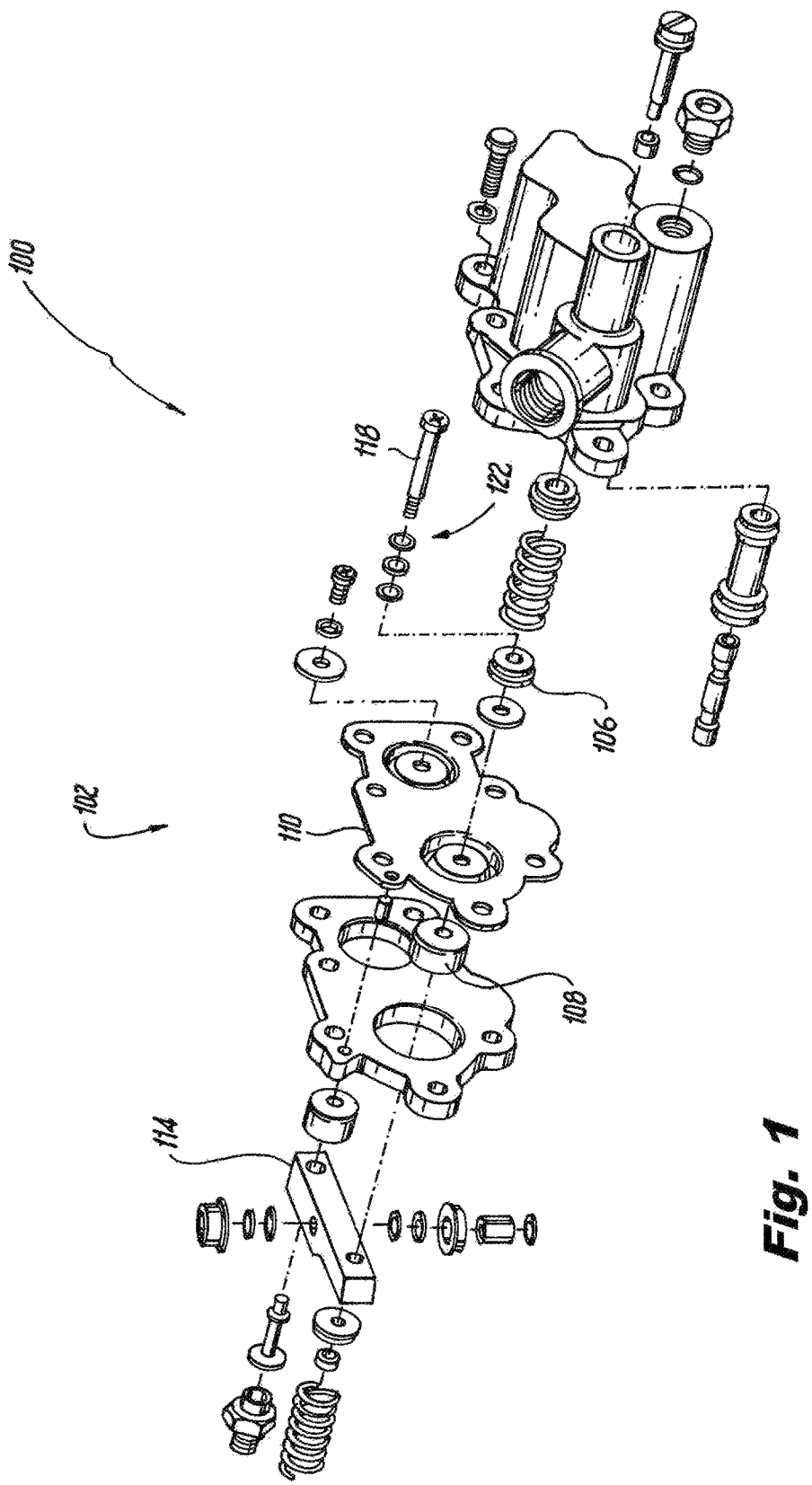
FIG. 1 is an exploded schematic view of an exemplary embodiment of a pressure relief valve controller constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of the Pressure Relief Valve Controller (PRVC) in accordance with the disclosure is shown in FIG. 1 and is designated generally by reference character 100. Other embodiments of the systems and methods in accordance with the disclosure, or aspects thereof, are provided in FIGS. 2A, 2B, and 3, as will be described. The systems and methods described herein can be used on an aerospace system to prevent diaphragm deformation and rupture without significant affect to the calibration of the PRVC.

As shown in FIG. 1, a PRVC 100 for regulating air pressure of, by way of example only, an aircraft component is shown. The PRVC 100 includes a housing 102. The housing 102 encloses the components of the PRVC 100. The housing 102 includes a spring 104, a spring seat 106, a piston 108, and a diaphragm 110. The spring seat 106 is operatively connected to the spring 104. In some embodiments, the spring 104 may at least partially surround a first end 112 of the spring seat 106. In other embodiments, the spring 104 may contact the first end 112 of the spring seat 106. In certain embodiments, the housing 102 may also include a lever 114. The lever 114 contacts the piston 108. The lever 114 has a fulcrum 113 mounted to the housing 102.

Figure 2A:
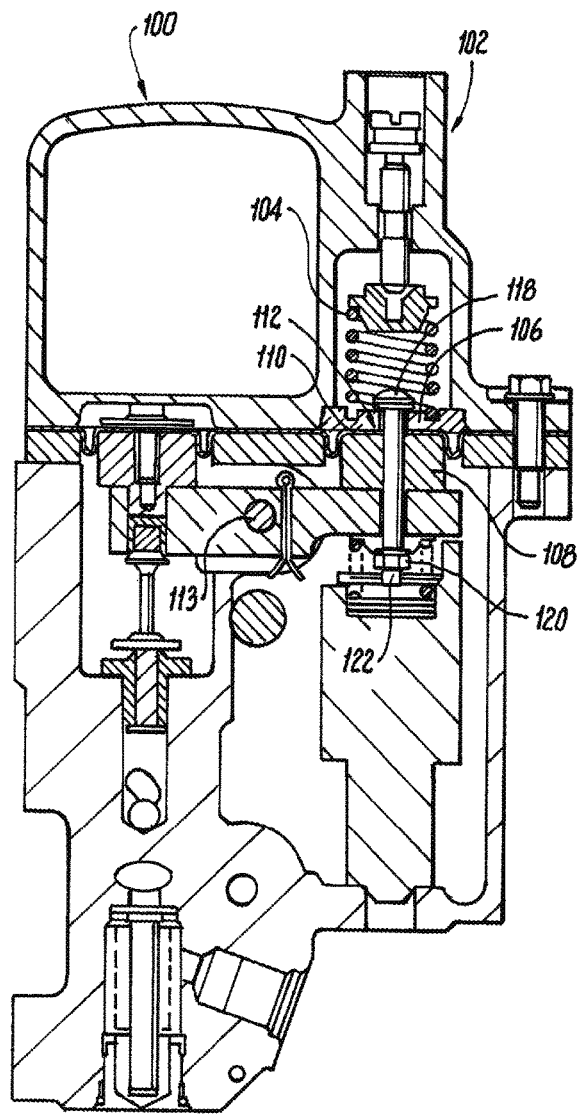
FIG. 2A is a schematic cross-sectional view of an exemplary embodiment of the pressure relief valve controller of FIG. 1, showing a spring seat, a piston, and a diaphragm disposed between the spring seat and the piston.

The diaphragm 110 can be at least partially disposed between the spring seat 104 and the piston 108. In certain embodiments, the diaphragm 110 is a rubber material; however, it is contemplated that the diaphragm 110 may comprise any suitable material. As shown in FIG. 2A, the diaphragm 110 contacts the spring seat 106 and, in certain embodiments, the diaphragm 110 may be pinched between the spring seat 106 and the piston 108.

Figure 2B:
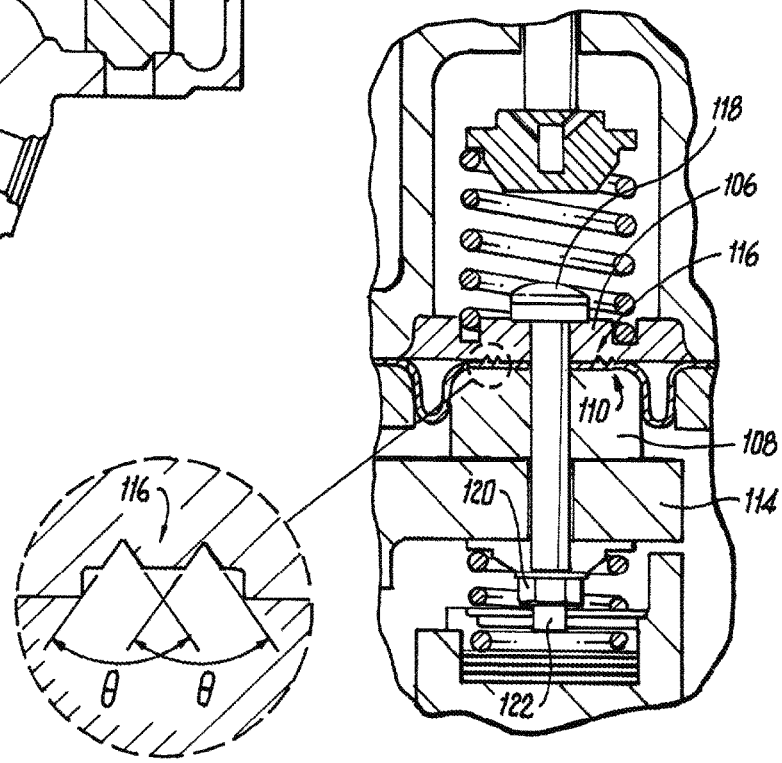
FIG. 2B is a schematic cross-sectional view of a portion of the PRVC of FIG. 2A, showing at least one groove disposed in the spring seat and the diaphragm occupying the at least one groove.

With reference now to FIG. 2B, at least one of the spring seat 106 and/or the piston 108 has at one or more grooves 116 disposed therein (e.g., on a surface for communicating with the diaphragm 110). In some embodiments, the one or more grooves 116 may be annular and/or conical. Furthermore, the one or more grooves 116 may be concentric. Further, each groove 115 may have a V cross-sectional shape. As further shown in FIG. 2B, the spring seat 106 may include two concentric grooves 116 disposed therein; however, it is contemplated that any suitable number of grooves may be utilized. The one or more grooves 116 may be machined into the spring seat 106. In some embodiments, each groove 116 may be a triangular cutout, and in certain embodiments, each groove 116 may have an internal fillet of between about 0.001 inch and about 0.2 inch radius.

By way of example only, each groove 116 may have a depth of between about 0.01 inch and about 0.2 inch, for example a depth of about 0.025 inch. By way of further example, each groove 116 may form an angle of between about 40 degrees and about 85 degrees, for example, an angle of about 60 degrees. The diaphragm 110 is disposed within each of the grooves 116 of the spring seat 106. As such, the diaphragm 110 forms to the negative of the grooves 116 of the spring seat 106 to create a keyed interface between the diaphragm 110 and the spring seat 106. As such, the diaphragm 110 conforms into the one or more grooves 116 of the spring seat 106.

It is contemplated that, in addition to or instead of grooves 116, the spring seat 106 can include protrusions. Any other suitable frictional surface is contemplated herein.

Each of the spring seat 106, the piston 108, and/or the diaphragm 110 may have a hole disposed therethrough, as shown in FIG. 1. The hole in any of the spring seat 106, the piston 108, and/or the diaphragm 110 may be disposed at a relative center of the spring seat 106, the piston 108, and/or the diaphragm 110, respectively. The PRVC 100 may further include a fastener 118 (e.g., a bolt or any other suitable fastener) disposed through each of the spring seat 106, the piston 108, and/or the diaphragm 110, for example, the fastener 118 may be disposed through each hole, respectively. A nut 120 may be operatively connected and/or coupled to the fastener 118 at a first end 122 of the fastener 118. As such, the spring seat 106, the piston 108, and/or the diaphragm 110 may be secured by the fastener 118 once the nut 120 is attached to the fastener 118 at the first end 122 of the fastener 118. As the nut 120 is tightened to the fastener 118, the diaphragm 110 may become pinched between the spring seat 106 and the piston 108. As the diaphragm 110 is pinched between the spring seat 106 and the piston 108, the diaphragm 110 may further enter into and/or conform to each of the one or more grooves 116 formed in the spring seat 106, as shown in FIG. 2B.

Figure 3:
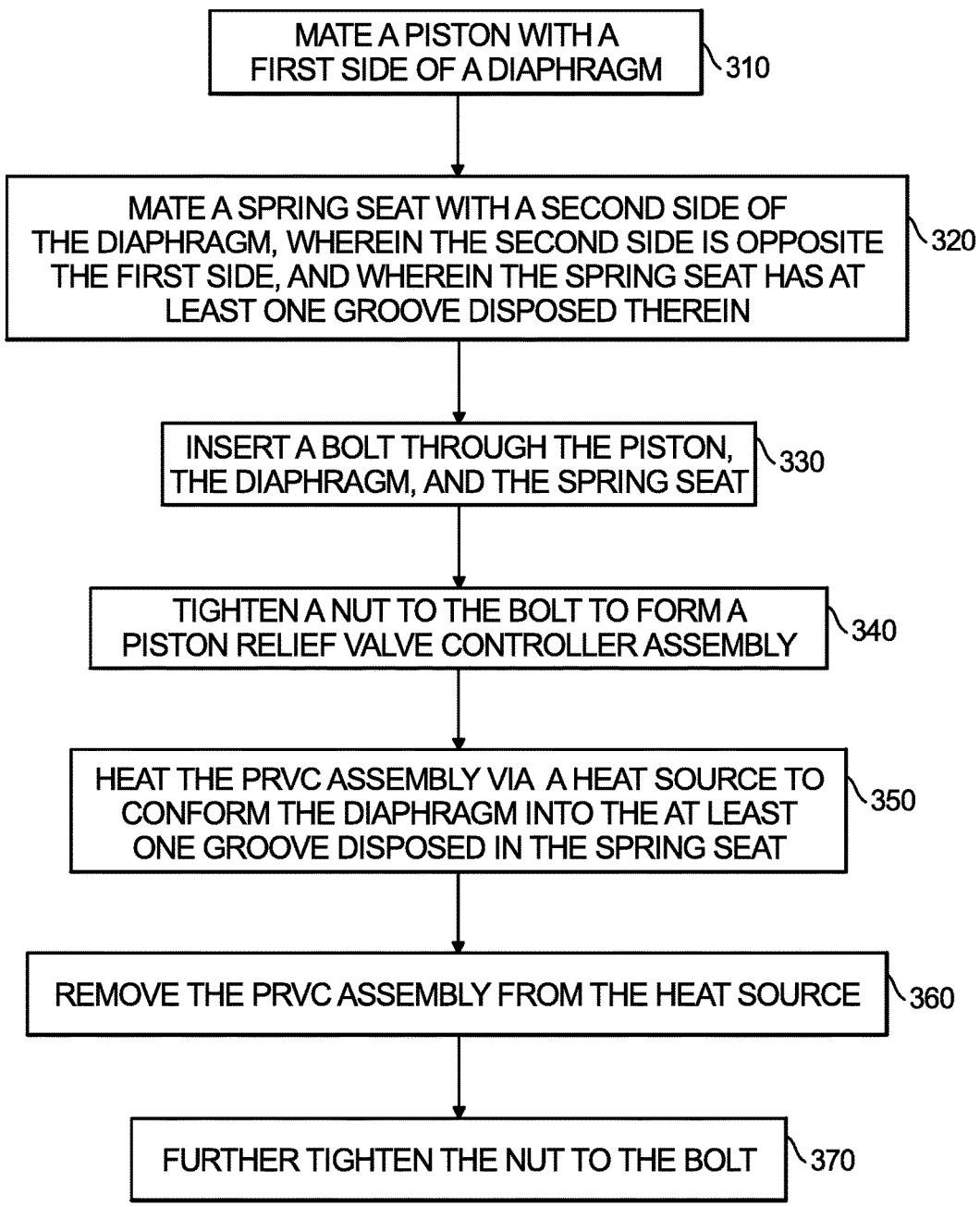
FIG. 3 is a schematic flow diagram illustrating operations of a method for assembling a pressure relief valve controller, in accordance with the present disclosure.

FIG. 3 is a schematic flow diagram illustrating operations of a method 300 for assembling a pressure relief valve controller (PRVC). At operation 310 a piston is mated with a first side of a diaphragm. For example piston 108 is mated with diaphragm 110 such that the piston 108 contacts the diaphragm 110. At operation 320 a spring seat is mated with a second side of the diaphragm. The second side of the diaphragm is opposite the first side of the diaphragm. As such, the diaphragm is disposed between the piston and the spring seat. The spring seat has at least one groove disposed therein. The groove may be machined out of the diaphragm, and may be similar to the at least one groove 116 described supra.

At operation 330, a fastener is inserted through the piston, the diaphragm, and the spring seat. The fastener may be inserted through center hole in each of the piston, the diaphragm, and the spring seat, respectively. At operation 340, a nut is tightened to the fastener to form a pressure relief valve controller (PRVC) assembly. The PRVC assembly may be for use within a PRVC.

At operation 350, the PRVC assembly is heated via a heat source. The heating of the PRVC assembly may occur at a temperature of between about 37 degrees Celsius and about 177 degrees Celsius. The heating of the PRVC assembly may occur for, by way of example only, between about 10 minutes and about 180 minutes, for example about 60 minutes. This heat soak process of the PRVC assembly warms the diaphragm, which in certain embodiment comprises a rubber material as described supra, thus allowing the diaphragm to become more compliant. As the diaphragm is heated, the diaphragm may begin to take the shape of spring seat, as the diaphragm is pinched between the spring seat and the piston. As the spring seat has at least one groove disposed therein, the second side of the diaphragm deforms and/or conforms into the negative space of the at least one groove in the spring seat. As such, a keyed interface between the diaphragm and the spring seat is created. The heating of the diaphragm conforms the diaphragm into the at least one groove disposed in the spring seat.

At operation 360, the PRVC assembly is removed from the heat source. In certain embodiments, the PRVC assembly may be allowed to cool. At operation 370, the nut is further tightened to the fastener. The further tightening further conforms a portion of the diaphragm to the at least one groove disposed in the spring seat. Additionally, such further tightening allows the diaphragm to further enter into the at least one groove disposed in the spring seat and/or further solidify the contact between the second side of the diaphragm and the spring seat. In some embodiments, the further tightening occurs while the diaphragm is at a temperature above room temperature, as the diaphragm is still compliant and easily takes the shape of the spring seat and the groove(s) disposed therein.

The methods and systems of the present disclosure, as described above and shown in the drawings, provide for an improved pressure relief valve controller with a spring seat having at least one groove disposed therein with superior properties including the creation of a keyed interface during a heat soak process which allows a portion of the diaphragm to enter into the at least one groove of the spring seat. The keyed interface provides sufficient strength to not allow the diaphragm to be pulled over the piston due to any excess pressure. Further benefits of the present disclosure also include the improvement and/or elimination of diaphragm ruptures without affecting the calibration of the PRVC. Furthermore, the addition of the one or more grooves disposed in the spring seat of the PRVC permits modification of existing spring seats without requiring replacement or reproductions. Additional benefits also include a PRVC which is lighter, and a diaphragm which has an increased service life, both reducing overall costs relative to conventional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A pressure relief valve controller comprising:
   a housing:
   a spring positioned within the housing;
   a spring seat in operable communication with the spring;
   a piston;
   a diaphragm, a portion of which is disposed between the spring seat and the piston, wherein one or more grooves and/or protrusions are disposed on at least one of the spring seat or the piston; and
   a lever contacting the piston, wherein the lever has a fulcrum mounted to the housing.

2. The pressure relief valve of claim 1, wherein the one or more grooves are disposed on at least one of the spring seat, wherein the diaphragm conforms to the one or more grooves of the spring seat to increase radial retention of the portion of the diaphragm between the piston and the spring seat.

3. The pressure relief valve controller of claim 1, further comprising a fastener disposed through each of the spring seat, the piston, and the diaphragm.

4. The pressure relief valve controller of claim 3, further comprising a nut coupled to the fastener.

5. The pressure relief valve controller of claim 1, wherein the one more grooves are annular.

6. The pressure relief valve controller of claim 5, wherein the one or more grooves are conical.

7. The pressure relief valve controller of claim 1, wherein the diaphragm comprises a rubber material.

8. The pressure relief valve controller of claim 1, wherein the diaphragm is contacting the spring seat.

9. The pressure relief valve controller of claim 1, wherein the one or more grooves includes two annular grooves that are concentric.

10. The pressure relief valve controller of claim 1, wherein the spring seat comprises a plurality of annular grooves disposed therein.

11. The pressure relief valve controller of claim 10, wherein the plurality of annular grooves have a V cross-sectional shape.

12. The pressure relief valve controller of claim 10, wherein the spring seat further comprises a hole disposed through a center of the spring seat.

* * * * *